A. M. George.

Spike Machine.

No. 351. Reissued Feb. 12, 1856.

THE GRAPHIC CO. PHOTO-LITH. 39 & 41 PARK PLACE, N.Y.

UNITED STATES PATENT OFFICE.

A. M. GEORGE, OF NASHUA, NEW HAMPSHIRE.

IMPROVEMENT IN SPIKE-MACHINES.

Specification forming part of Letters Patent No. 13,945, dated December 18, 1855; Reissue No. 351, dated February 12, 1856.

*To all whom it may concern:*

Be it known that I, AMMI M. GEORGE, of Nashua, in the county of Hillsborough and State of New Hampshire, late of the city, county, and State of New York, have invented a new and useful Improvement in Machines for Making Railroad, Ship, and other Metallic Spikes; and I do hereby declare that the following is a full, clear, and exact description of the same, reference being had to the annexed drawings, making a part of this specification, in which—

Figure 1:
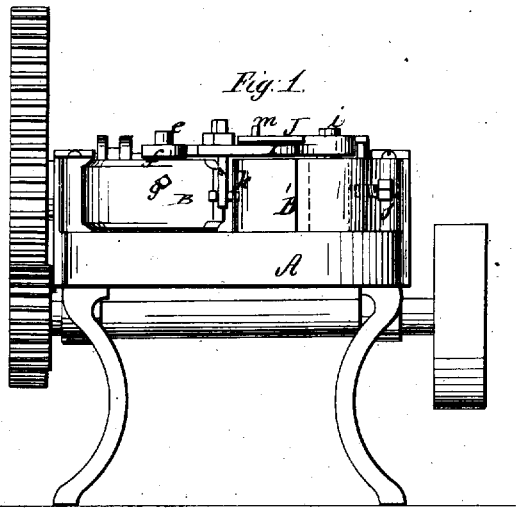
Figure 2:
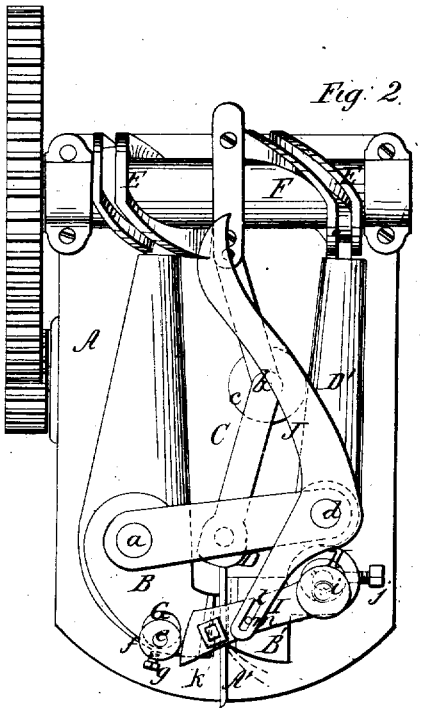
Figure 3:
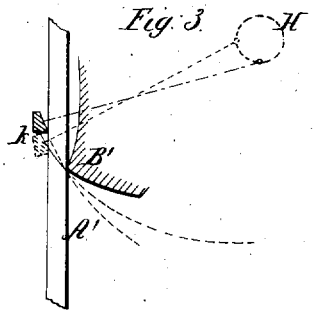

Figure 1 is a front view of my improvement. Fig. 2 is a plan or top view of the same. Fig. 3 is a diagram showing the manner in which the varying taper of the bolts or point of the spikes is obtained.

Similar letters of reference indicate corresponding parts in the several figures.

My invention consists in having the lever to which the cutter for cutting off the blanks or bolts is attached work on a pivot or rod which is placed eccentrically on the upper end of a cylinder fitted within one of the jaws of the machine, and also having the roller which gives the cutting movement to the cutter work on a pivot or rod, also placed eccentrically on a cylinder which is fitted within the other jaw of the machine, by which arrangement, as will be presently shown, the cutting movement of the cutter may be varied so as to form long or short taper points on the bolts or spikes, as may be desired.

To enable those skilled in the art to make and use my invention, I will proceed to describe its construction and operation.

A represents a bed or platform, on which two jaws, B B′, are placed horizontally. One of these jaws, B, works on a pin, *a*, attached to the bed or platform. The other jaw is stationary, or is permanently attached to the bed or platform.

C represents a toggle, to the end of the outer arm of which a heading-die, D, is attached, of the form desired, which works against the inner edges of the two jaws. On the connecting-pin *b* of the toggle a roller, *c*, is placed.

D′ is a lever, one end of which works on a pin, *d*, attached to or inserted in the bed or platform A. The inner end of the jaw B and the inner end of the lever D work in grooved cams E on a shaft, F, placed transversely on one end of the bed or platform A.

Within the movable or vibrating jaw B there is fitted loosely a vertical cylinder, G, on the upper end of which a pivot or rod, *e*, is attached, said pivot or rod having a friction-roller, *f*, upon it. The cylinder G is fitted loosely in the jaw B, so that it may be turned therein when necessary, the cylinder being secured at any desired point by a set-screw, *g*.

Within the permanent or stationary jaw B′ there is fitted a similar cylinder, H, which also has a pivot or rod, *i*, placed eccentrically on its upper end, on which pivot or rod a lever, I, is fitted. The cylinder H is secured in the desired position in the jaw B′ by a set-screw, *j*. To the end of the lever I a vertical cutter is attached.

J is a lever, which works upon the upper end of the pin *d* of the lever D′. The outer end of this lever has a slot, *l*, made through it, in which slot a pin, *m*, on the jaw B′, fits. The inner end of the lever is actuated by one of the cams E, as will be presently shown.

Operation: The bar A′, from which the spikes are formed, is suitably heated and placed between the two jaws B B′, the inner end of the bar bearing against the heading-die D, which at this time serves as a stop. Motion is then given the shaft F in any proper manner, and the jaw B is moved by its cam E toward the stationary jaw B′, the back ends of the jaws grasping the bar. The toggle C is then operated by the lever D′, acting against the roller *c*, and the die D is moved forward and forms the desired head upon the spike, while the lever I is moved outward from the jaws by the roller *f*, and the cutter *k* cuts the blank or bolt off obliquely from the bar A′, and the oblique end is shaped into the desired taper form as the jaw B closes or bears fully against the jaw B′, that is stationary. The oblique direction of the cutter *k* is regulated at the will of the operator by changing the positions of the pivots or rods *e i*, which is done by turning the cylinders G H in the jaws. The points of the spikes are thereby wrought into a more or less taper form, as may be desired. The cutter *k* is returned to its original position or between the jaws B B′ by means of the lever J, which is acted upon by the cam E of the jaw B.

I do not claim the jaws B B′, nor the toggle C, with heading-die attached, and variable at pleasure, for they have been previously known and used; but

I claim—

The friction-roller *f* and lever I, to which the cutter *k* is attached, when said roller and lever are placed upon adjustable centers or pivots or rods *e i*, in combination with pointing-dies inserted in the jaws, arranged substantially as shown, for the purposes specified.

A. M. GEORGE.

Witnesses:

FRANCIS O. J. SMITH,

J. G. MYERS.